(12) United States Patent
Wagner

(10) Patent No.: US 6,625,380 B2
(45) Date of Patent: Sep. 23, 2003

(54) METHOD OF PRODUCING A HOLLOW MIXING ROD, AND A MIXING ROD

(75) Inventor: Bernhard Wagner, Kahla (DE)

(73) Assignee: Carl Zeiss Jena GmbH, Jena (DE)

( * ) Notice: Subject to any disclaimer, the term of this patent is extended or adjusted under 35 U.S.C. 154(b) by 44 days.

(21) Appl. No.: 10/041,020

(22) Filed: Jan. 7, 2002

(65) Prior Publication Data

US 2002/0118946 A1 Aug. 29, 2002

(30) Foreign Application Priority Data

Feb. 28, 2001 (DE) .......................................... 101 09 591

(51) Int. Cl.$^7$ ................................................. G02B 6/10
(52) U.S. Cl. ........................ 385/146; 385/125; 362/551
(58) Field of Search ................................ 385/125, 123, 385/146, 147; 362/551, 559, 560

(56) References Cited

U.S. PATENT DOCUMENTS 4,260,220 A * 4/1981 Whitehead .................. 385/133
6,547,400 B1 * 4/2003 Yokoyama ................... 353/98

* cited by examiner

*Primary Examiner*—Hemang Sanghavi
(74) *Attorney, Agent, or Firm*—Eugene E. Renz, Jr.

(57) ABSTRACT

In a method of producing a hollow mixing rod having a hollow space of quadrangular cross-section, the following steps are carried out:

producing a first and a second side part, each of which has a T-shaped cross-section comprising a crossbar and a central bar protruding therefrom, which central bar comprises a reflective end surface averted from the crossbar and, viewed in cross-section, a first and a second side surface extending from the end surface to the crossbar, wherein, at least in the first side part, the end surface and the first side surface, viewed in cross-section, converge at an angle which is not equal to 90°, producing a third and a fourth side part, each provided with a reflective, planar inner side, assembling the four side parts such that the end surfaces of the first and second side parts face each other and that the reflective inner sides of the third and fourth side parts, viewed in cross-section, extend parallel to each other and have their edge portions resting on the side surfaces of the central bars, so that the hollow space is limited by forming the quadrangular cross-section.

8 Claims, 4 Drawing Sheets

METHOD OF PRODUCING A HOLLOW MIXING ROD, AND A MIXING ROD

CROSS-REFERENCE TO RELATED APPLICATION

This application claims priority of German patent application no. 101 09 591.0, filed Feb. 28, 2001, the complete disclosure of which is hereby incorporated by reference.

FIELD OF THE INVENTION

The invention relates to a method of producing a hollow mixing rod and to a hollow mixing rod comprising four side parts, each of which is provided with one reflective inner side forming one side each of a hollow space, which extends from a light inlet area to a light outlet area and has a quadrangular cross-section.

BACKGROUND OF THE INVENTION

In the case of such a hollow mixing rod, it is very important for its properties that the reflective inner sides of the four side parts be assembled such that no gap whatsoever is formed between them at which light losses would occur. In particular, if the quadrangular cross-section of the hollow space is neither rectangular nor square and, consequently, its cross-sectional sides converge in at least one corner at an angle which is not equal to 90°, the production of such a hollow mixing rod is very costly.

OBJECT AND SUMMARY OF THE INVENTION

In view thereof, it is an object of the invention to provide a method of producing a hollow mixing rod, by which the hollow mixing rod is easily and accurately produced, even if two sides of the cross-section of the hollow space converge at an angle not equal to 90°. Further, a hollow mixing rod as mentioned above is to be improved such that it can be produced as easily as possible.

According to the invention, this object is achieved by the method of producing a hollow mixing rod having a hollow space of quadrangular cross-section, which method comprises the steps of producing a first and a second side part, each of which has a T-shaped cross-section comprising a crossbar and a central bar protruding therefrom, which comprises a reflective end surface averted from the crossbar and, viewed in cross-section, a first and a second side surface extending from the end surface to the crossbar, wherein, at least in the first side part, the end surface and the first side surface, viewed in cross-section, converge at an angle which is not equal to 90°, producing third and fourth side parts, each provided with a reflective, planar inner side, assembling the four side parts such that the end surfaces of the first and second side part face each other and the reflective inner sides of the third and fourth side parts, viewed in cross-section, extend parallel to each other and have their edge portions resting on the side surfaces of the central bars, so that the hollow space is limited by forming the quadrangular cross-section. This method requires the end surface of only one side part having a T-shaped cross-section to be chamfered relative to the side surfaces. Such chamfering of the end surface is possible in a particularly easy and accurate manner by grinding a T-shaped blank, whose end surface extends perpendicularly to the side surfaces. On the one hand, such grinding of the end surface may be performed with high accuracy and precision. On the other hand, said grinding may also be performed simultaneously on a plurality of side parts, so that a production in large quantities is also possible with the same high precision.

In order to achieve the desired planarity of the end surfaces, said end surfaces are preferably polished after grinding.

If the material of the T-shaped blank is a material which does not have sufficient reflective properties, the ground and optionally polished end surface may be additionally provided with a reflective coating. This may be realized, e.g., by reflective coating with a silver layer or by applying a dielectric reflective coating. Depending on the type of the reflective coating, a protective coating may additionally be applied on the reflective coating, if necessary.

The end surface may also be formed by milling, instead of by grinding, with the end surface preferably being polished as well.

The side parts may be manufactured from glass, metal, metal alloys, ceramics or plastics. If plastic material is used, the first and second side parts may be formed, e.g. by injection molding, together with the chamfered end surface. The end surface may preferably be subjected to further treatment, if the planarity of the end surface is to be improved. In this case, the end surface may also be provided with a reflective coating. If a metal or a metal alloy is used, the reflective property of the end surface can only be obtained by polishing. In the case of these materials, too, the side parts may already be formed with chamfered end surfaces, e.g. by casting methods. Alternatively, of course, grinding or milling is also possible for chamfering the end surface.

In a preferred embodiment of the production method according to the invention, once the four side parts have been assembled, a piece of shrink tubing is pulled over said four side parts, which is then heated. Due to said heating, the tubing shrinks or contracts and, consequently, urges the four side parts against each other. Since the shrink tubing retains its contracted shape upon cooling, the side parts become permanently fixed. The shrink tubing may be disposed in the central region of the hollow mixing rod, as viewed in the longitudinal direction thereof. Alternatively, two pieces of shrink tubing may be provided at the respective end sections of the hollow mixing rod, as viewed in the longitudinal direction thereof. The use of the shrink tubing leads to a simple and effective manner of fixing the four side parts relative to each other, which is easily carried out without any problem. In particular, as the four side parts are urged together by the shrink tubing, this has the effect that no gaps are present between the reflectively coated or reflective inner sides, so that the hollow mixing rod is easy to produce with the required high accuracy.

The hollow mixing rod according to the invention comprising four side parts, each of which has a planar, reflective inner side forming one side each of a hollow space having a quadrangular cross-section and extending from a light inlet area to a light outlet area, is wherein the first and second side parts each have a T-shaped cross-section comprising a crossbar and a central bar which protrudes therefrom and whose end surface averted from the crossbar forms the reflective inner side of the side part and which comprises, viewed in cross-section, a first and a second side surface extending from the end surface to the crossbar, with the reflective inner sides of the third and fourth side parts being disposed parallel to each other, when viewed in cross-section, and having their edge portions resting on the side surfaces of the central bars, whereby, at least in the first side part, the end surface and the first side surface, viewed in cross-section, converge at an angle which is not equal to 90°. Thus, the hollow mixing rod according to the invention is particularly easy to produce, since forming a cross-section of the hollow space wherein two sides converge in one corner at an angle which is not equal to 90° merely requires, e.g., that the end surface of the first side part be obliquely ground. This is easily and simply possible with the required high accuracy. Thus, the first side part preferably comprises an obliquely ground end surface. Consequently, the end surface of the central bar defines the angle at which the two sides of the cross-section converge and which is not equal to 90°. Further, the edge portions of the inner sides of the third and fourth side part rest on the side surfaces of the central bars, so that the central bars of the first and second side part also serve to predetermine and to maintain the distance between the reflective inner sides of the third and fourth side parts.

In a further advantageous embodiment of the hollow mixing rod according to the invention, the four side parts are held together by a piece of shrink tubing. The use of shrink tubing for holding together and fixing the four side parts results in a simplified manufacture of the hollow mixing rod, since the shrink tubing only needs to be fitted over the four side parts and then heated. The fixing and positioning of the four side parts is then effected virtually automatically, because the contracting shrink tubing adapts to the external shape of the four side parts and presses them against each other. By being urged against each other in this manner, the third and and fourth side part are guided with their reflective inner sides on the side surfaces of the central bars and then urged against the crossbars with their longitudinal sides. The shrink tubing also prevents the hollow mixing rod having gaps between the reflective inner sides, so that the reflective surfaces lie next to each other in a manner impermeable to light.

Advantageously, in the hollow mixing rod according to the invention, the end surface and the first side surface of the second side part, viewed in cross-section, may also converge at an angle not equal to 90°. This allows a symmetrical cross-sectional shape of the hollow space, e.g. a trapezoidal cross-section, to be realized. However, it is possible also to realize parallelogram-shaped cross-sections, or even cross-sections whose cross-sectional sides converge at different angles in each of the four corners thereof.

In particular, the third and fourth side parts of the hollow mixing rod according to the invention may each have an I-shaped cross-section, with the longitudinal sides of the third and fourth side parts contacting the crossbars of the first and second side parts. Thus, a very compact hollow mixing rod is realized with a stable structure.

The hollow mixing rod according to the invention may be used, in particular, in an optical device for generating and projecting an image. The optical device preferably contains a light source, an imaging element and projection optics, the hollow mixing rod being interposed between the light source and the imaging element. The light from the light source is coupled into the hollow mixing rod via the light inlet area and guided inside the hollow mixing rod to the light outlet area. The light rays impinging on the reflective inner sides are guided to the light outlet area by one or more reflexions. This has the effect that the luminance distribution in the light outlet area is more uniform as compared with that in the light inlet area, so that a field which is illuminating as uniformly as possible is generated in the light outlet area. This illuminating field is imaged, e.g. by interposed intermediate optics, on the imaging element so as to illuminate the latter as uniformly as possible. The imaging element is controlled by a control unit on the basis of predetermined image data, in order to generate the image which is projected onto a projection surface by the projection optics.

The invention will be explained in more detail below, byway of example and with reference to the drawings.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 1:
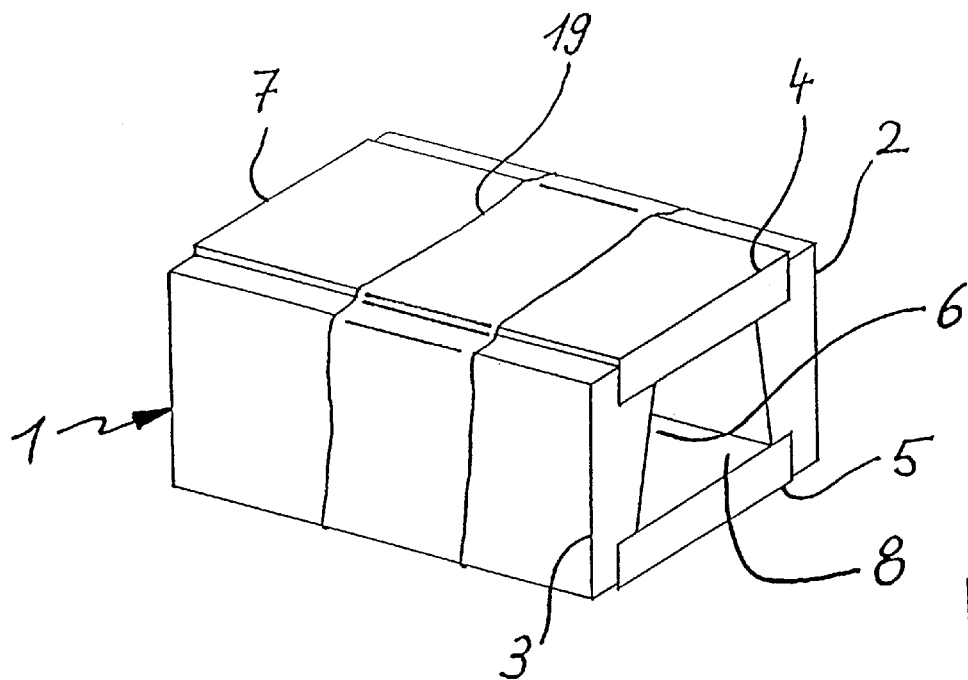
FIG. 1 shows a perspective view of the hollow mixing rod according to the invention.
Figure 2:
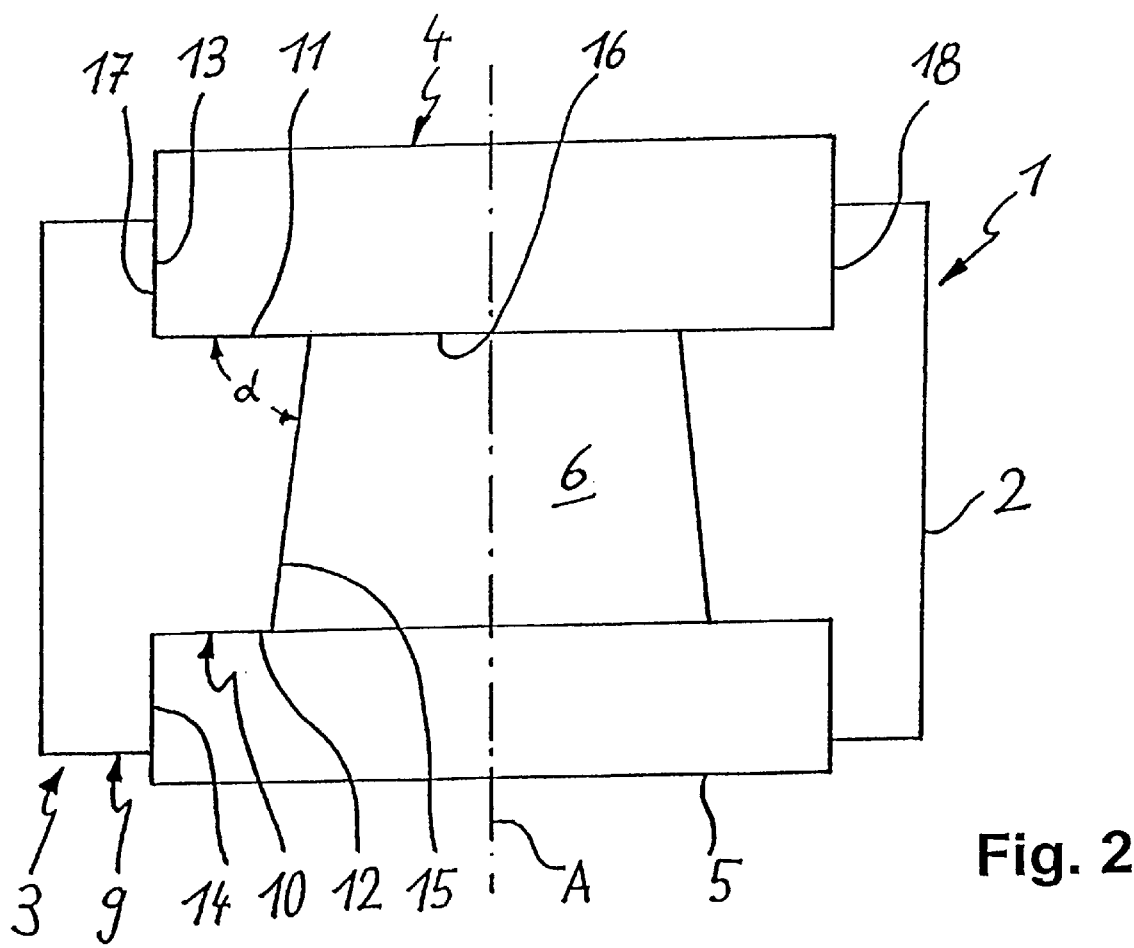
FIG. 2 is a front view of the hollow mixing rod shown in FIG. 1.

As shown in FIGS. 1 and 2 (the piece of shrink tubing 19 of FIG. 1 is not shown in FIG. 2), the hollow mixing rod 1 comprises four side parts 2, 3, 4 and 5, which form a hollow space 6 having a trapezoidal cross-section, with both ends of the hollow mixing rod 1 being open as viewed in the longitudinal direction thereof and forming a trapezoidal light inlet area 7 as well as a trapezoidal light outlet area 8.

As particularly shown in FIG. 2, the hollow mixing rod 1 is symmetrical relative to a central axis A lying in a cross-sectional plane, so that the first and second side parts 2, 3 and the third and fourth side parts 4, 5, respectively, have the same structure. Therefore, in the following, only the structure of the second and third side parts 3, 4 will be described in detail.

The second side part 3 has a T-shaped cross-section comprising a crossbar 9 and a central bar 10 centrally protruding therefrom. The central bar 10 extends perpendicularly to the crossbar 9, so that the side surfaces 11, 12 of the central bar 10 extend perpendicularly to the basic surfaces 13, 14 of the crossbar 9. In the central bar 10, the planar end surface 15 averted from the crossbar 9 connects both side surfaces 11, 12 with each other and converges with the side surface 11 at an angle $\alpha\alpha$, which is smaller than 90°. In the embodiment presently shown the angle is 83°. The end surface 15, which limits one side of the hollow space 6, is reflective. In the presently described embodiment, the second side part 3 is made of glass, and the end surface 15 is provided with a reflective layer of, e.g., silver or with a dielectric reflective layer.

The third side part 4 has an I-shaped cross-section comprising a reflective inner side 16. The third side part 4 is also made of glass, and the reflective inner side 16 is in turn reflectively coated, e.g. with a silver layer or a dielectric reflective layer. The shape of the third side part 4 is selected such that its longitudinal sides 17, 18 extend perpendicularly to the reflective inner side 16.

The first and second side parts 2, 3 are disposed at a predetermined distance from each other, with both end surfaces 15 facing each other, and form the right and left side parts of the hollow mixing rod 1. The top and bottom side parts of the hollow mixing rod 1 are realized by the third and fourth side parts 4, 5, with both lateral edge portions of the third side part 4 resting on the side surfaces 11 of the central bars 10 and both lateral edge portions of the fourth side part 5 resting on the side surfaces 12 of the central bars 10, so that the reflective inner sides 16 of the third and fourth side parts 4, 5, viewed in cross-section, are parallel to each other. The four side parts 2 to 5 are urged against each other and fixed by a piece of shrink tubing 19 (shown only in FIG. 1) fitted over the hollow mixing rod 1. Thus, on the one hand, the basic surfaces 13, 14 of the crossbars 9 of the first and second side parts 2, 3 are urged against the longitudinal sides 17, 18 of the third and fourth side parts 4, 5 and, on the other hand, the reflective inner sides 16 of the third and fourth side parts 4, 5 are urged against the side surfaces 11, 12 of the central bars 10 of the first and second side parts 2, 3 with their lateral edge regions or portions, as viewed in cross-section. Thus, a very compact and stable hollow mixing rod 1 is provided, which is easy to manufacture and to mount and which comprises the hollow space 6 having a quadrangular cross-section, wherein the sides of the cross-section converge in each of the four corners at an angle which is not equal to 90°.

Figure 3A:
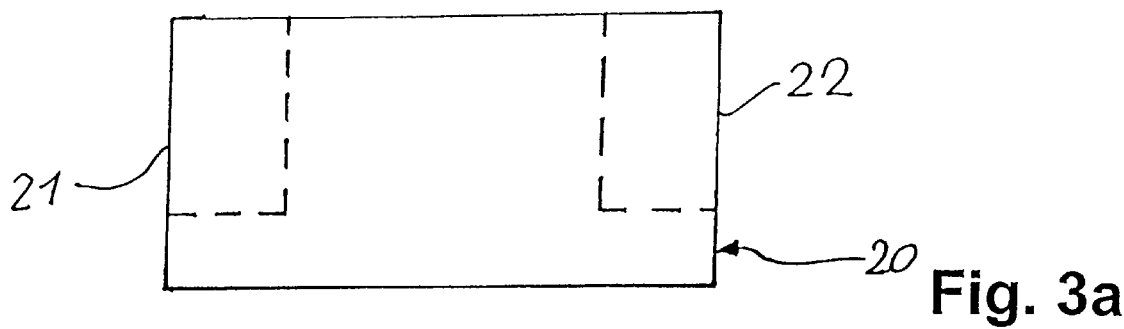
FIGS. 3a–3c show process steps for manufacturing the T-shaped side part.
Figure 3B:
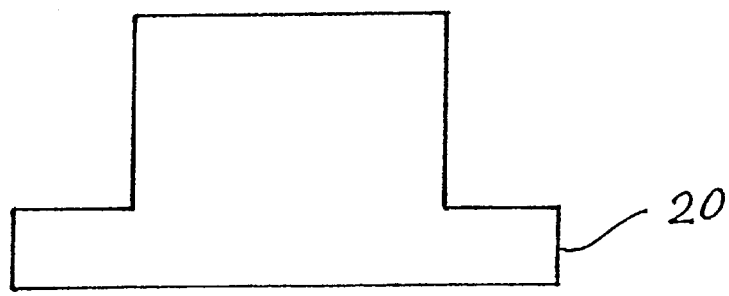
Figure 3C:
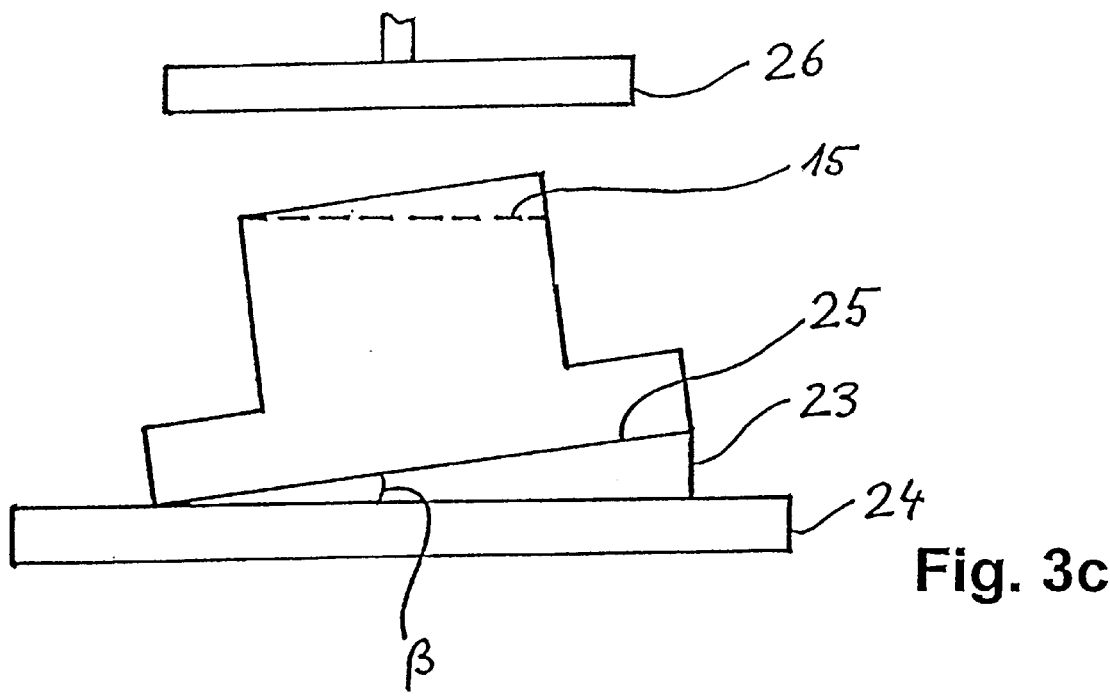

In the following, a method according to the invention for producing the hollow mixing rod 1 shown in FIGS. 1 and 2 is described. The T-shaped side part 2, 3 is manufactured from a glass blank 20 having an I-shaped cross-section (FIG. 3a), whose length is selected in accordance with the length of the hollow mixing rod 1. The side regions 21, 22 are removed from this glass blank 20 (for example, by grinding), so that the T-shaped cross-section shown in FIG. 3b is formed. Subsequently, this T-shaped glass blank is mounted on a wedge 23 of a carrier plate 24, with the wedge surface 25, on which the T-shaped glass blank 20 rests, being tilted at the angle ββ relative to the carrier plate 24. The angle ββ is selected such that it corresponds to the angle of 90°-αα. In the example described here, the angle ββ is therefore 7°. The end surface of the central bar 10 averted from the crossbar of the T-shaped glass blank 20 is then ground by a grinding wheel 26 until the end surface 15 (indicated by a dotted line in FIG. 3c) is formed with the desired inclination relative to the side surfaces of the central bar. This end surface 15 is then polished and provided with a reflective coating. In this way, any desired angle of inclination of the end surface 15 relative to the side surfaces 11, 12 of the central bar 10 may be formed in a very simple manner. Thus, the first and second side parts 2, 3 are finished. The carrier plate 24 and the wedge 23 may also be one tool.

The third and fourth side parts 4, 5 are also formed from an I-shaped blank, whose inner side, which limits the hollow space 6 in the assembled condition of the hollow mixing rod 1, is polished and provided with a reflective coating.

The four side parts 2 to 5 thus formed are then assembled according to the structure shown in FIGS. 1 and 2. Then, the piece of shrink tubing 19 is fitted thereover, with its internal cross-section being greater than the external cross-section of the hollow mixing rod 1, thus allowing easy fitting. Next, the shrink tubing 19 is heated so as to contract, thus urging the four side parts 2 to 5 against each other and fixing them. The piece of shrink tubing 19 retains this contracted shape even after cooling, so that the side parts 2 to 5 are urged against each other permanently and are, consequently, also permanently fixed.

Figure 4:
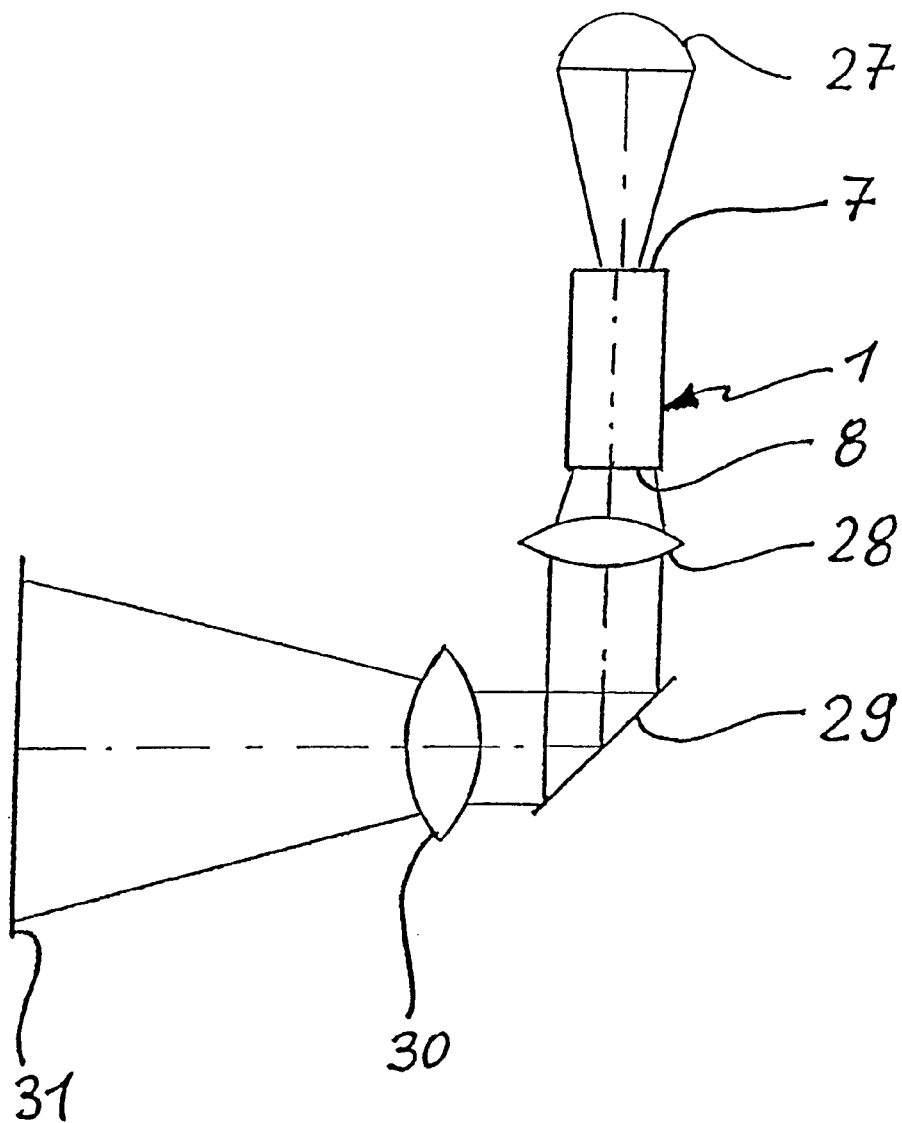
FIG. 4 is a schematic top view of an optical device comprising the lightmixing rod of the invention.

FIG. 4 shows the use of the hollow mixing rod 1 of the invention in an optical device for generating and projecting an image. This optical device comprises a light source 27 and the hollow mixing rod 1 disposed subsequently thereto, into whose light inlet area 7 facing the light source 27 light from the light source 1 is coupled, which is then guided inside the hollow mixing rod 1 to the light outlet area 8. The optical device further contains intermediate optics 28 disposed subsequently to the light outlet area 8 of the hollow mixing rod 1, which optics direct the light exiting from the light outlet area 8 onto an imaging element 29 such that the latter is illuminated as uniformly as possible. As the imaging element 29, for example, a tilting mirror matrix or an LCD matrix may be used. The imaging element 29 is controlled by a control unit (not shown) on the basis of predetermined image data, so as to enable adjustment of the desired image, which is then projected on a projection surface 31 by projection optics 30 of the optical device.

Figure 5:
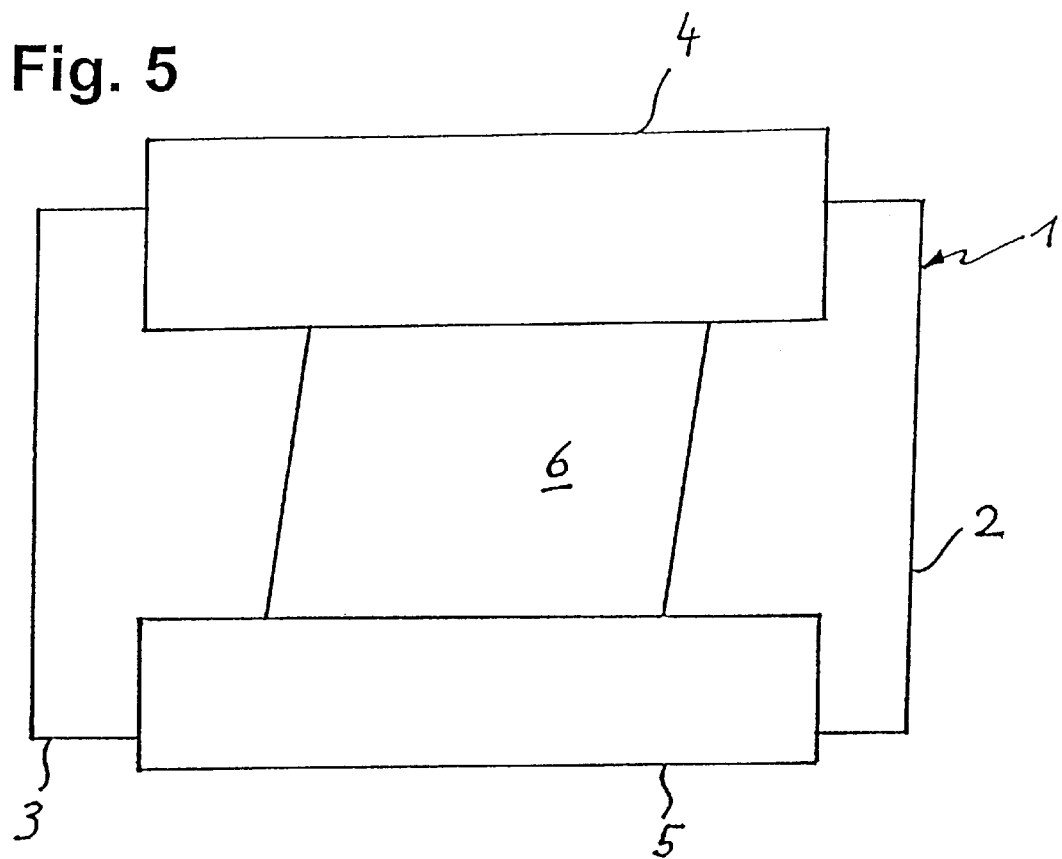
FIG. 5 shows a front view of a light mixing rod of the invention according to a further embodiment.

FIG. 5 shows a further embodiment of the hollow mixing rod 1. This embodiment differs from the embodiment shown in FIG. 2 in that the first side part 2 is rotated around 180° such that the hollow space 6 has a parallelogram-shaped cross-section. In this embodiment and also in the embodiment of the hollow mixing rod 1 shown in FIGS. 1 and 2, the first and second side parts 2, 3 have the same cross-sectional shape, so that advantageously only one type of T-shaped side parts comprising an oblique end surface 15 has to be produced. However, it is also possible to select the inclination of the end surface 15 of each of the first and second side parts 2, 3 to differ in size. In this case, two different types of side parts will then have to be produced.

Figure 6:
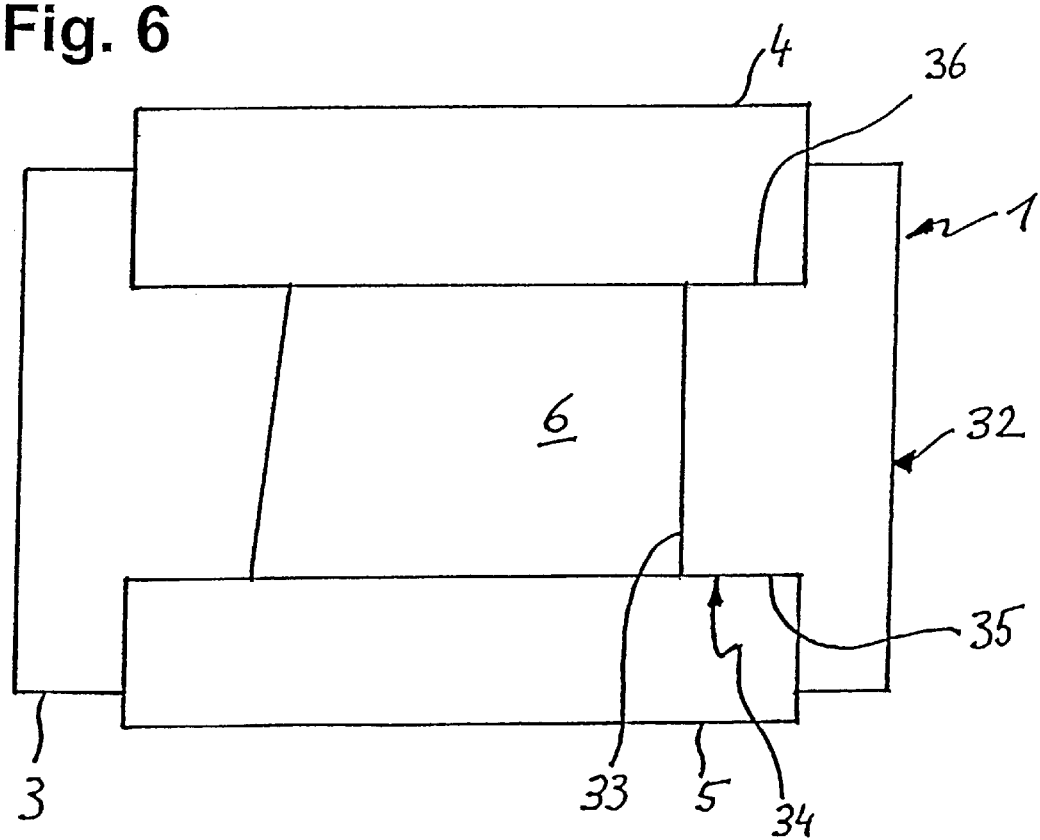
FIG. 6 is a front view of a light mixing rod of the invention according to a still further embodiment.

FIG. 6 shows a still further embodiment, which, as compared to the embodiment shown in FIGS. 1 and 2, instead of being provided with the first side part 2, is provided with a T-shaped side part 32, wherein the end surface 33 of the central bar 34 extends perpendicularly to the side surfaces 35, 36 of the central bar 34.

What is claimed is:

1. A method of producing a hollow mixing rod having a hollow space of quadrangular cross-section, which method comprises the steps of:

producing a first and a second side part, each of which has a T-shaped cross-section comprising a crossbar and a central bar protruding therefrom, which central bar comprises a reflective end surface averted from the crossbar and, viewed in cross-section, a first and a second side surface extending from the end surface to the crossbar, wherein, at least in the first side part, the end surface and the first side surface, viewed in cross-section, converge at an angle which is not equal to 90°, producing a third and a fourth side part, each provided with a reflective, planar inner side, assembling the four side parts such that the end surfaces of the first and second side parts face each other and that the reflective inner sides of the third and fourth side parts, viewed in cross-section, extend parallel to each other and have their edge portions resting on the side surfaces of the central bars, so that the hollow space is limited by forming the quadrangular cross-section.

2. The production method as claimed in claim 1, wherein, for producing the first side part, a blank is first produced having a T-shaped cross-section, in which blank, viewed in cross-section, the end surface of the central bar averted from the crossbar converges at a right angle with the side surface, followed by grinding the end surface such that the desired angle between the end surface and the first side surface is formed.

3. The production method as claimed in claim 1, which comprises, upon assembly of the four side parts, pulling a piece of shrink tubing over said four side parts, which is then shrunk by heating, so that the four side parts are urged against each other and fixed.

4. The production method as claimed in claim 1, which comprises, prior to assembly, providing the inner sides and the end surfaces with a reflective coating so as to impart reflective properties to them.

5. A hollow mixing rod comprising four side parts, each of which has a reflective inner side forming one side each of a hollow space having a quadrangular cross-section and extending from a light inlet area to a light outlet area, wherein the first and second side parts each have a T-shaped cross-section comprising a crossbar and a central bar which protrudes therefrom and whose end surface averted from the crossbar forms the reflective inner side of the side part and which comprises, viewed in cross-section, a first and a second side surface extending from the end surface to the crossbar, with the reflective inner sides of the third and fourth side parts being disposed parallel to each other, as viewed in cross-section, and having their edge portions resting on the side surfaces of the central bars, whereby, at least in the first side part, the end surface and the first side surface, viewed in cross-section, converge at an angle which is not equal to 90°.

6. The hollow mixing rod as claimed in claim 5, wherein the four side parts are held together by a piece of shrink tubing.

7. The hollow mixing rod as claimed in claim 5, wherein, viewed in cross-section, the end surface and the first side surface of the second side part converge at an angle which is not equal to 90°.

8. The hollow mixing rod as claimed in claim 5, wherein the third and fourth side parts each have an I-shaped cross-section, said third and fourth side parts having their longitudinal sides contact the crossbar of the first and second side parts.

* * * * *